(12) United States Patent
Grajeda

(10) Patent No.: US 12,077,029 B2
(45) Date of Patent: Sep. 3, 2024

(54) SOLENOID ASSEMBLY

(71) Applicant: BeijingWest Industries Co., Ltd., Beijing (CN)

(72) Inventor: Yinko I. Grajeda, Kettering, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 250 days.

(21) Appl. No.: 17/492,534

(22) Filed: Oct. 1, 2021

(65) Prior Publication Data

US 2023/0107524 A1   Apr. 6, 2023

(51) Int. Cl.
| | |
|---|---|
| F16K 31/06 | (2006.01) |
| B60G 17/056 | (2006.01) |
| F16F 9/34 | (2006.01) |
| F16F 9/46 | (2006.01) |

(52) U.S. Cl.
CPC ............ B60G 17/056 (2013.01); F16F 9/469 (2013.01); F16K 31/0675 (2013.01); F16K 31/0679 (2013.01); B60G 2500/114 (2013.01); F16F 9/461 (2013.01); F16F 9/463 (2013.01)

(58) Field of Classification Search
CPC ... B60G 17/056; B60G 2500/114; F16F 9/34; F16F 9/463; F16F 9/464; F16F 9/461; F16F 9/469; F16K 31/0675; F16K 31/0679
See application file for complete search history.

(56) References Cited

U.S. PATENT DOCUMENTS

| | | | |
|---|---|---|---|
| 2,458,123 A | 1/1949 | Wasserlein | |
| 2,715,199 A | 8/1955 | Olaf | |
| 2,784,331 A | 3/1957 | Rodemann | |
| 3,383,534 A | 5/1968 | Ebbs | |
| 3,564,469 A | 2/1971 | Pokorski | |
| 3,805,099 A | 4/1974 | Kelly | |

(Continued)

FOREIGN PATENT DOCUMENTS

| | | |
|---|---|---|
| CN | 102667225 A | 9/2012 |
| CN | 203548689 U | 4/2014 |

(Continued)

OTHER PUBLICATIONS

Extended European Search Report issued on May 12, 2023 for counterpart European patent application No. 22197749.9.

(Continued)

*Primary Examiner* — Thomas W Irvin
(74) *Attorney, Agent, or Firm* — Dickinson Wright PLLC

(57) ABSTRACT

A suspension system of an associated vehicle. The suspension system comprises an outer reservoir tube extending along an axis between a first end and a second end and defining a chamber. A piston assembly is at least partially located in the chamber. The piston assembly includes a piston rod and a piston head. A solenoid assembly is connected to the piston rod. The solenoid assembly comprises a core including a core head and a core body. A spool extends about the core body and defines a space. A coil is wrapped around the spool within the space. An induction plate is at least partially located between the spool and the core head. As the input current is modulated the induction plate promotes the induction of eddy currents opposing the field induction attenuating the force ripples of the magnetic field buildup and decay.

20 Claims, 4 Drawing Sheets

(56) References Cited

U.S. PATENT DOCUMENTS

| | | | |
|---|---|---|---|
| 4,166,262 A | 8/1979 | Jencks et al. | |
| 4,302,743 A | 11/1981 | Araki | |
| 4,880,205 A | 11/1989 | Ellison | |
| 5,551,540 A | 9/1996 | Forster et al. | |
| 5,578,978 A | 11/1996 | Zoerner | |
| 8,813,922 B2* | 8/2014 | Mochizuki | F16F 9/50 188/313 |
| 9,217,484 B2 | 12/2015 | Slusarczyk et al. | |
| 9,644,760 B2* | 5/2017 | Mori | F16F 9/465 |
| 10,458,506 B2* | 10/2019 | Kamakura | F16F 9/50 |
| 10,458,509 B2* | 10/2019 | Kobayashi | F16F 9/465 |
| 10,711,912 B2 | 7/2020 | Kanai et al. | |
| 10,746,247 B2 | 8/2020 | Slusarczyk et al. | |
| 2008/0185246 A1* | 8/2008 | Park | F16F 9/3485 188/322.15 |
| 2012/0279815 A1 | 11/2012 | Iwase et al. | |
| 2013/0195689 A1* | 8/2013 | Mochizuki | F16F 9/34 417/300 |
| 2016/0025176 A1* | 1/2016 | Kamakura | F16K 31/42 137/487.5 |
| 2016/0025237 A1* | 1/2016 | Mori | F16K 1/36 251/30.01 |
| 2018/0259031 A1* | 9/2018 | Kobayashi | F16F 9/465 |
| 2019/0249792 A1 | 8/2019 | Bahr et al. | |
| 2021/0012939 A1* | 1/2021 | Kamakura | H01F 7/16 |
| 2022/0243839 A1* | 8/2022 | Kobayashi | F16K 31/0651 |
| 2022/0252127 A1* | 8/2022 | Kobayashi | H01F 7/16 |
| 2022/0254555 A1* | 8/2022 | Kobayashi | F16K 31/0675 |

FOREIGN PATENT DOCUMENTS

| | | |
|---|---|---|
| CN | 107939891 A | 4/2018 |
| CN | 111942095 A | 11/2020 |
| DE | 102019125061 A1 | 3/2021 |
| JP | 63025689 | 5/1988 |
| KR | 200305768 Y1 | 2/2003 |
| KR | 20040049230 A | 6/2004 |

OTHER PUBLICATIONS

First Office Action and search report issued on Jun. 10, 2023 for counterpart Chinese patent application No. 202210945812.8, along with machine EN translation.

First Office Action and Search Report issued on Nov. 18, 2023 for counterpart Chinese patent application No. 202210945812.8, along with machine EN translation.

* cited by examiner

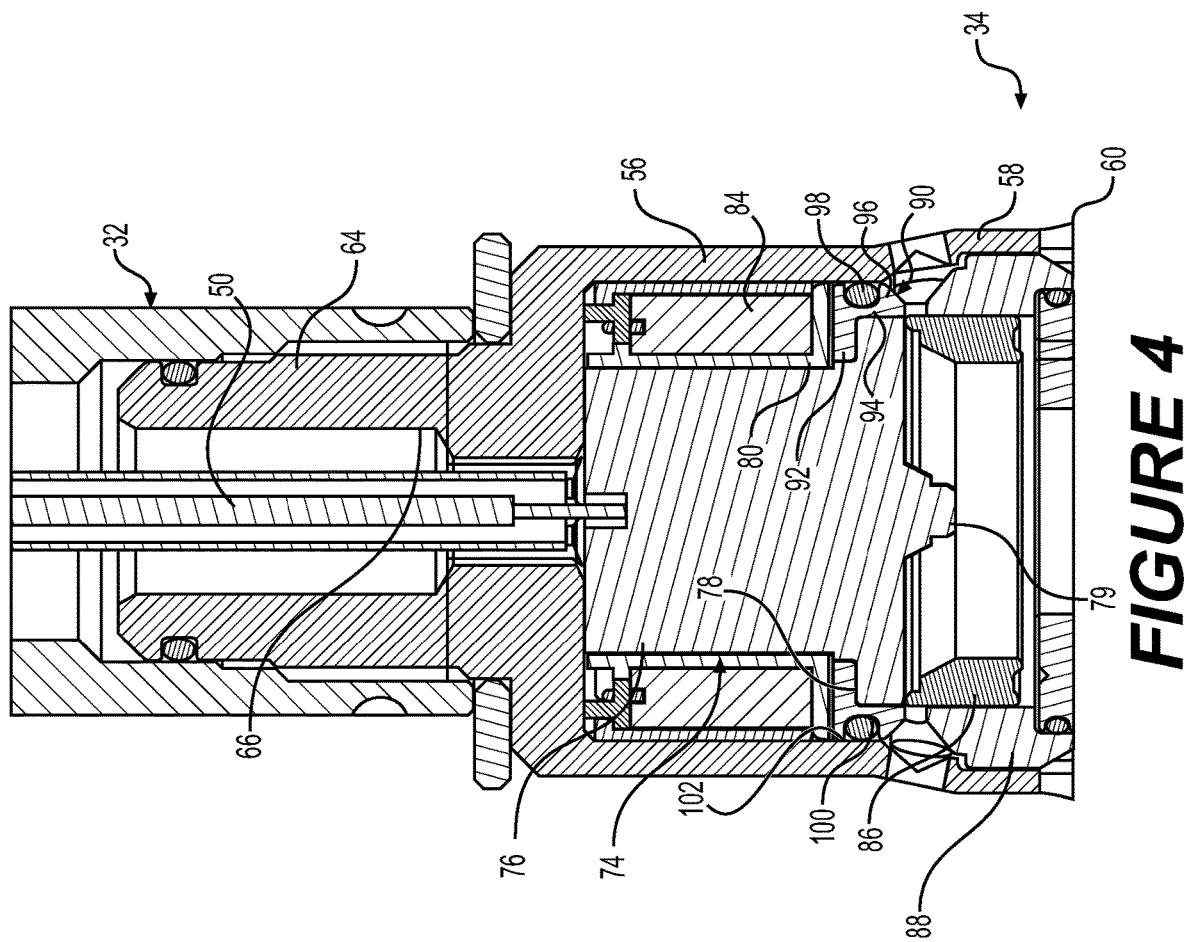

SOLENOID ASSEMBLY

BACKGROUND OF THE INVENTION

1. Field of the Invention

The present invention generally relates to a solenoid assembly for a suspension system and a suspension system with a solenoid assembly.

2. Description of the Prior Art

Vehicles, such as automobiles, typically have a suspension system that includes absorber units that are mounted between wheels of the vehicle and a vehicle body or substructure. The suspension system is generally configured based on vehicle integration to keep wheels in contact with a driving surface by absorbing energy from forces on the wheels or other portions of the vehicle. As technology continues to evolve, various types of absorber units have been developed. One particularly popular type of absorber unit is configured to be operable in one of two different stiffness settings. The two different stiffness settings may also be known as "comfort mode" and "sport mode," respectfully.

One such prior art absorber unit is disclosed in U.S. Pat. No. 10,746,247. The absorber unit includes a piston assembly having a piston assembly disposed on a center axis. The piston assembly includes a piston rod disposed on the center axis and attached to a piston head. A regulator is attached to the piston rod and defines a compartment to receive the piston head. The regulator has a first aperture and a second aperture. A restrictor divides the compartment into a first and second portion. An actuator is disposed in the compartment and movable between an opened and a closed position. A coil is disposed about a core for generating an electromagnetic field to switch between the operational stiffness settings. When switching between stiffness settings, instability and system behavior deviates from either comfort or sport modes as a result of a magnetic force ripple reacting to a varying input frequency to the coil.

Accordingly, there is a continuing desire to improve upon the operational framework and efficiency of suspension systems that offer switchable modes of stiffness with a reduction in force ripple reaction.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

The invention provides for suspension system with a solenoid assembly that improves upon the operational framework and efficiency of suspension systems that offer switchable modes of stiffness by providing an induction plate that reduces or eliminates magnetic force ripple caused by a varying input frequency to a coil.

It is one aspect of the present invention to provide a solenoid assembly for a suspension system of an associated vehicle. The solenoid assembly comprises a core including a core head and a core body. A spool extends about the core body and defines a space. A coil is wrapped around the spool within the space and an induction plate is at least partially located between the spool and the core head.

It is another aspect of the present invention to provide a suspension system of an associated vehicle. The suspension system comprises an outer reservoir tube extending along an axis between a first end and a second end and defining a chamber. A piston assembly is at least partially located in the chamber. The piston assembly includes a piston rod and a piston head. A solenoid assembly is connected to the piston rod. The solenoid assembly comprises a core including a core head and a core body. A spool extends about the core body and defines a space. A coil is wrapped around the spool within the space. An induction plate is at least partially located between the spool and the core head.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a cross-sectional side view of the piston head from FIG. 3 illustrating a solenoid assembly and an induction plate.

DESCRIPTION OF THE ENABLING EMBODIMENT

Example embodiments will now be described more fully with reference to the accompanying drawings. In general, the subject embodiments are directed to a solenoid assembly for the suspension system of a vehicle. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the several views, a suspension system including a solenoid assembly is provided. The solenoid assembly improves upon the operational framework and efficiency of suspension systems that offer switchable modes of stiffness by providing an induction plate that reduces or eliminates magnetic force ripple that is caused by a varying input frequency to a coil.

Figure 1:
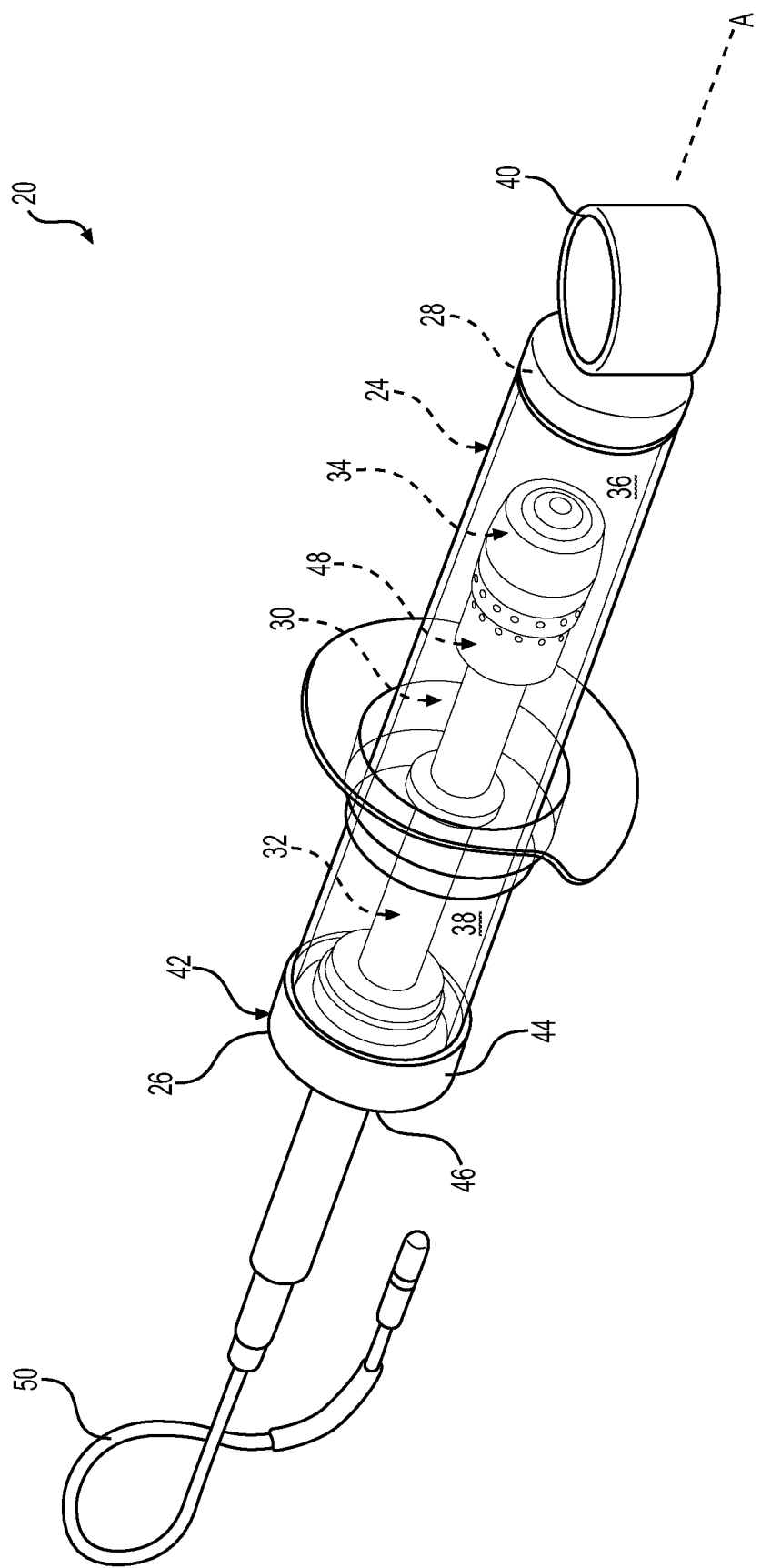
FIG. 1 is a perspective view of a suspension system in accordance with principles of the present disclosure.

With initial reference to FIG. 1, the suspension system 20 includes an outer reservoir tube 24 defining a chamber 36, 38. The outer reservoir tube 24 extends along an axis A between a first end 26 and a second end 28. The suspension system 20 includes a piston assembly 30 located in the chamber 36, 38 and extending along the axis A. The piston assembly 30 includes a piston rod 32 extending to a piston head 34 that is sized similar to an inner diameter of the reservoir tube 24. The piston head 34 divides the chamber 36, 38 includes a into a compression chamber 36 and a rebound chamber 38. The compression chamber 36 is located between the second end 28 and the piston head 34 and the rebound chamber 38 is located between the first end 26 and the piston head 34. In operation, the piston head 34 travels from the first end 26 towards the second end 28 during compression (i.e., in a compression direction) and from the second end 28 towards the first end 26 during rebound (i.e., in a rebound direction). An attachment ring 40 may be located on the second end 28 to connect the suspension system 20 to an associated vehicle. A rod guide sleeve 42 may be located on the first end 26. The rod guide sleeve 42 includes an axially extending portion 44 that hugs an outer surface reservoir tube 24 and a radially extending portion 46 that covers the first end 26. The radially extending portion 46 defines an opening for slideably accommodating and guiding the piston rod 32.

A solenoid assembly 48 extends between a distal end of the piston rod 32 and the piston head 34 connecting the piston head 34 with the piston rod 32 facilitating the piston rod 32 to move the piston head 34 between a compression stroke and a rebound stroke. A cable 50 is electrically connected to the solenoid assembly 48 through a channel 52 (FIGS. 2 and 3) defined by the piston rod 32 for providing an electric current to the solenoid assembly 48 to generate an electromagnetic field.

Figure 2:
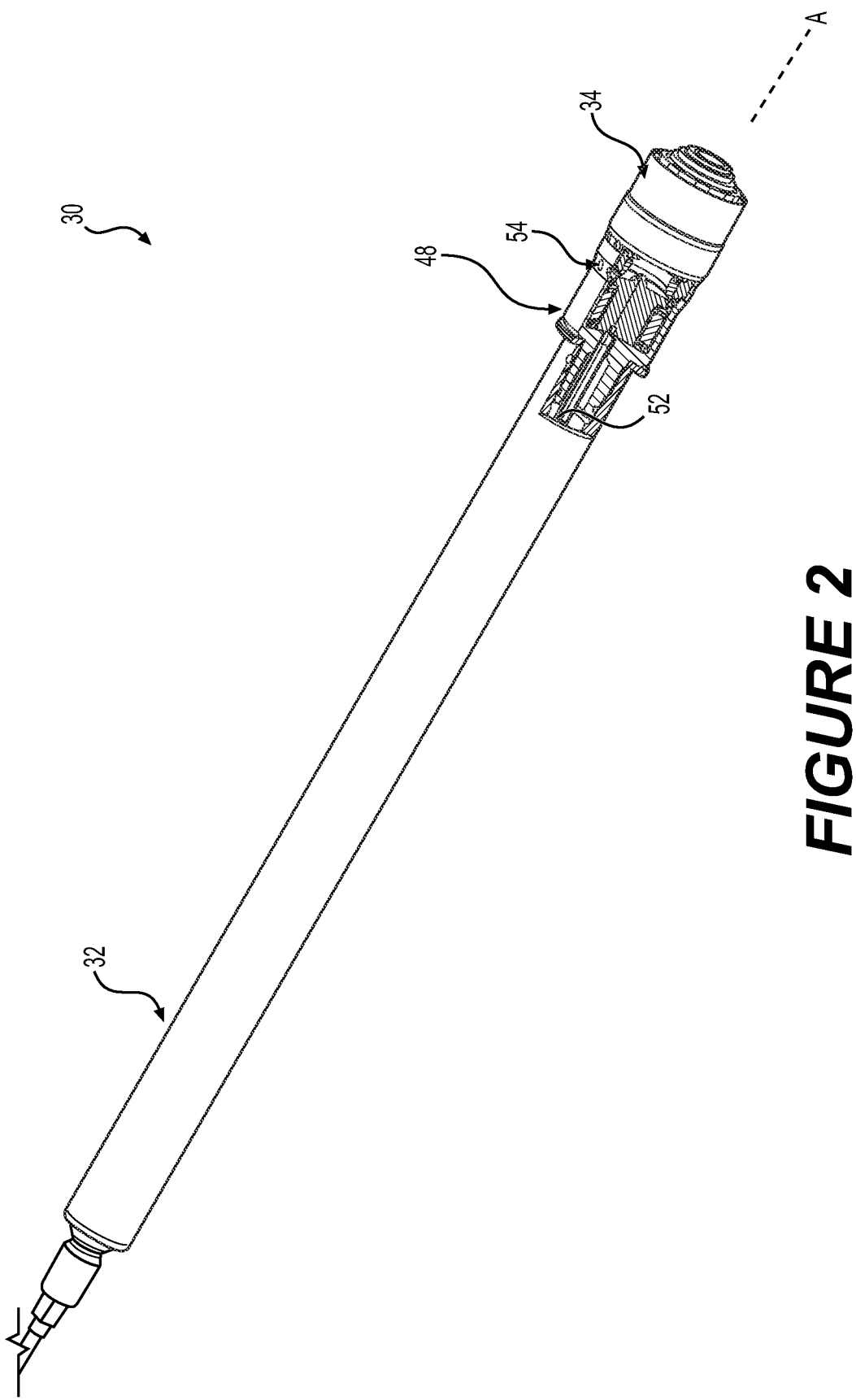
FIG. 2 is a perspective view of a piston assembly of the suspension system from FIG. 1.
Figure 3:
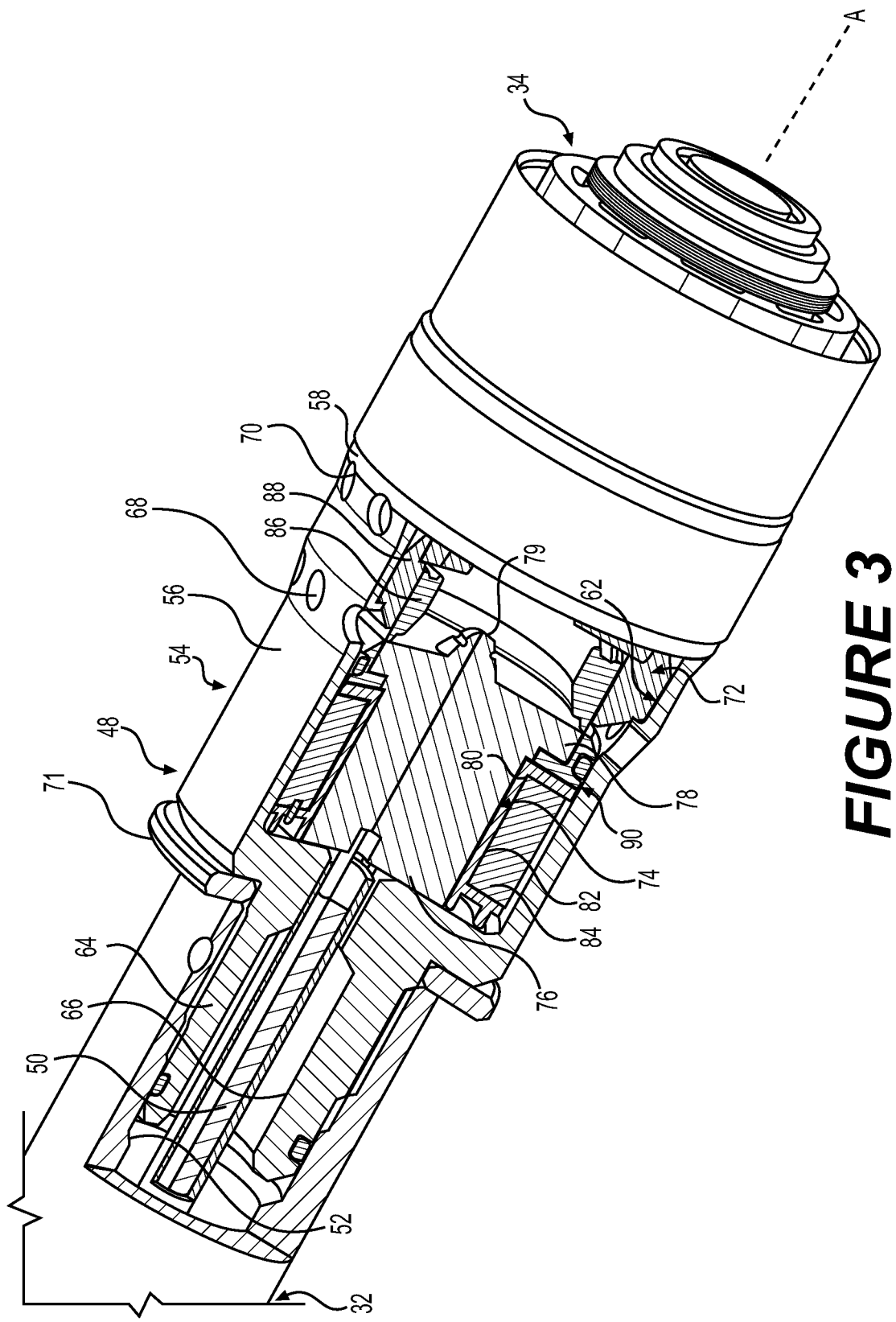
FIG. 3 is a sectional perspective view of a piston head of the piston assembly from FIG. 2.

FIG. 2 is a perspective view of the piston assembly 30 including a portion of the piston head 34 and solenoid assembly 48 cutout to show internal components therein. FIG. 3 is an enlarged view of the piston head 34 and solenoid assembly 48 from FIG. 2. The solenoid assembly 48 includes a body 54, having a generally cylindrical shape, and having a top portion 56, also having a generally circular shape, disposed adjacent to the distal end of the piston rod 32. The top portion 56 extends annularly about the center axis A and radially outwardly from the center axis A. The body 54 further includes a bottom portion 58 extending radially outwardly from the top portion 56, annularly about the center axis A, to a proximal end 60. The body 54 defines a compartment 62 extending between the top portion 56 and the proximal end 60 to receive the piston head 34. Stated another way, the bottom portion 58 extends between the piston head 34 and the piston rod 32 connecting the piston head 34 and the piston rod 32. In some embodiments, the body 54 may further include a collar portion 64, having a generally cylindrical shape, disposed in the channel 52 of the piston rod 32 and extending along the axis A to connect the body 54 to the piston rod 32. The collar portion 64 may further define a collar channel 66 extending along center axis A for receiving the cable 50 and connecting the cable 50 to the solenoid assembly 48. In some embodiments, the body 54 defines at least one first aperture 68 and at least one second aperture 70 axially spaced from the at least one first aperture 68. In some embodiments, the at least one first aperture 68 includes a plurality of axially aligned and circumferentially arrayed first apertures 68. In some embodiments, the at least one second aperture 70 includes a plurality of axially aligned and circumferentially arrayed second apertures 70. A bearing ring 71 may be located between an outer surface of the top portion 56 and the piston rod 32.

An actuator 72 may be at least partially located in the compartment 62. The actuator 72 is movable between a closed position and an open position. In the closed position, the actuator 72 restricts a fluid flow from at least one of the first apertures 68 and the second apertures 70 for providing a stiffer absorption property. In the open position, the fluid flow through the first apertures 68 and the second apertures 70 is unrestricted for providing a less-stiff ab sorption property.

The solenoid assembly 48 includes a core 74 located in the compartment 62 adjacent to the actuator 72. The core 74 may define a core body 76 that extends towards the piston head 32 to a core head 78 extending radially outwardly from the core body 76. A protrusion 79 may extend axially from the core head 78 opposite the core body 76. A spool 80 extends about the core body 76 and defines a space 82 for locating a coil 84 that is wrapped therearound to define ring-shaped winding having an inner diameter and an outer diameter. The cable 50 electrically connects to the coil 84 to generate an electromagnetic field. The actuator 72 includes a plunger 86 abutting the core head 78 opposite the core body 76. In some embodiments, the plunger 86 defines and outer diameter that is equal to an outer diameter of the core head 78. The plunger 86 extends from the core head 78 towards the second end 28. A plunger guide 88 extends about the plunger 86 in hugging engagement therewith. In some embodiments, the plunger 86 may be formed of a magnetic material such that the plunger 86 is moved between an open position and a closed position based on the presence of an electromagnetic field. In some embodiments, the plunger guide 88 may guide a magnetic flux to the plunger 86. More particularly, in the closed position, the plunger 86 is moved towards the core 74 to restrict fluid flow through at least one of the first apertures 68 and the second apertures 70 to provide stiffer damping properties. In the open position, the plunger 86 is moved away from the core 74 to permit fluid flow through the first apertures 68 and the second apertures 70 to provide less-stiff or softer damping properties.

With reference now to FIG. 3 and FIG. 4, further details of the solenoid assembly 48 will be further described. The solenoid assembly 48 includes an induction plate 90 located under the coil 84. The induction plate 90 may be annularly shaped and located in abutment with the spool 80. The induction plate 90 may be formed of stainless steel, steel alloy, Aluminum, Aluminum alloy, Copper, or Copper Alloy. In some embodiments, the induction plate 90 is formed of a material with a conductivity of at least 1,100,00 Siemens/m, a steel material with a conductivity of 1,100,000 Siemens/m, Aluminum material with a conductivity of 38,000,000 Siemens/m, a Copper material with a conductivity of 58,700,000 Siemens/m, or a combination thereof. The induction plate 90 includes a top ring portion 92 that is sandwiched between the spool 80 and the core head 78. The top ring portion 92 may include an inner diameter that is located radially inwardly from the inner diameter of the wrapping of the coil 84. The top ring portion 92 may further include an outer diameter that is located radially outwardly from the outer diameter of the wrapping of the coil 84. In some embodiments, the outer diameter of the top ring portion 92 abuts the bottom portion 58 of the body 54 and the inner diameter of the top ring portion 92 abuts and outer diameter of the core body 76. The induction plate 90 may further include a bridge portion 94 extending axially towards the second end 28 and away from the coil 84. The bridge portion 94 may be in hugging engagement with an outer diameter of the core head 78 and spaced from the bottom portion 58 of the body 54. A hook portion 96 extends radially outwardly from the bridge portion 94 and into abutment with the bottom portion 58 of the body 54. An O-ring ring 98 is located in a space defined by the top ring portion 92, the bridge portion 94, the hook portion 96, and the bottom portion 58 of the body 54. In some embodiments, at least one first weld interface 100 may be located between the induction plate 90 and the core 74. In some embodiments, at least one second weld interface 102 may be located between the induction plate 90 and the body 54. Therefore, the induction plate 90 may hermetically seal portions of the solenoid assembly 48 from fluid.

In operation, an associated controller dictates current supply to the coil 84. In some embodiments, this current supply is approximately 2 kHz frequency. As current is supplied to the coil 84, a magnetic field buildup and decay occurs as the current is modulated. This magnetic field buildup and decay results in the induction of eddy currents throughout the solenoid assembly 48. The eddy current induces an opposing magnetic field in the induction plate 90 attenuating the force ripples of the magnetic field buildup and decay.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A solenoid assembly for a suspension system of an associated vehicle, the solenoid assembly comprising:
   a core including a core head and a core body, wherein the core head extends radially outwardly from the core body;
   a spool extending about the core body and located in abutment with the core body and defining a space;
   a coil wrapped around the spool within the space; and
   an induction plate at least partially located between the spool and the core head, wherein the induction plate includes a top ring portion located between the spool and the core head and abutting the core body and the core head, wherein the top ring portion includes an inner diameter that is located radially inwardly from an inner diameter of a wrapping of the coil, and an outer diameter that is located radially outwardly from an outer diameter of the wrapping of the coil.

2. The solenoid assembly as set forth in claim 1, wherein the induction plate includes a bridge portion extending from the top ring portion in hugging engagement around the core head.

3. The solenoid assembly as set forth in claim 2, wherein the induction plate further includes a hook portion extending radially outwardly from the bridge portion.

4. The solenoid assembly as set forth in claim 3, wherein a space is defined between the hook portion and the bridge portion and wherein an O-ring is located in the space.

5. The solenoid assembly as set forth in claim 1, wherein a weld interface is located between and connects the induction plate and the core.

6. The solenoid assembly as set forth in claim 1, wherein the induction plate is formed of a material having a conductivity of at least 1,100,000 Siemens/m.

7. The solenoid assembly as set forth in claim 1, wherein the induction plate is formed of Copper.

8. The solenoid assembly as set forth in claim 1, wherein the induction plate is formed of Aluminum.

9. The solenoid assembly as set forth in claim 1, wherein the induction plate is formed of stainless steel.

10. The solenoid assembly as set forth in claim 9, including a body extending about the spool, the core, and the induction plate, wherein the body includes a collar portion defining a collar channel for accommodating a provided cable to electrically connect to the coil.

11. A suspension system of an associated vehicle, the suspension system comprising:
    an outer reservoir tube extending along an axis between a first end and a second end and defining a chamber;
    a piston assembly at least partially located in the chamber, the piston assembly including a piston rod and a piston head;
    a solenoid assembly connected to the piston rod, the solenoid assembly comprising:
    a core including a core head and a core body;
    a spool extending about the core body and defining a space;
    a coil wrapped around the spool within the space; and
    an induction plate at least partially located between the spool and the core head,
    wherein the induction plate includes a top ring portion located between the spool and the core head, wherein the top ring portion includes an inner diameter that is located radially inwardly from an inner diameter of a wrapping of the coil, and an outer diameter that is located radially outwardly from an outer diameter of the wrapping of the coil.

12. The solenoid assembly as set forth in claim 11, wherein the induction plate includes a bridge portion extending from the top ring portion in hugging engagement around the core head towards the piston head.

13. The solenoid assembly as set forth in claim 12, wherein the induction plate further includes a hook portion extending radially outwardly from the bridge portion.

14. The solenoid assembly as set forth in claim 13, wherein a space is defined between the hook portion and the bridge portion and wherein an O-ring is located in the space.

15. The solenoid assembly as set forth in claim 11, wherein a weld interface is located between and connects the induction plate and the core.

16. The solenoid assembly as set forth in claim 11, wherein the induction plate is formed of at least one of Copper, Aluminum, or stainless steel.

17. A solenoid assembly for a suspension system of an associated vehicle, the solenoid assembly comprising:
    a core including a core head and a core body;
    a spool extending about the core body and defining a space;
    a coil wrapped around the spool within the space; and an induction plate at least partially located between the spool and the core head, wherein a weld interface is located between and connects the induction plate and the core.

18. The solenoid assembly as set forth in claim 17, wherein the induction plate is formed of at least one of Copper, Aluminum, or stainless steel.

19. The solenoid assembly as set forth in claim 17, wherein the induction plate includes a top ring portion located between the spool and the core head.

20. The solenoid assembly as set forth in claim 19, wherein the induction plate includes a bridge portion extending from the top plate portion in hugging engagement around the core head.

* * * * *